(12) United States Patent
Okuda (10) Patent No.: US 11,879,733 B2
(45) Date of Patent: Jan. 23, 2024

(54) TIDAL CURRENT INFORMATION DISPLAY DEVICE

(71) Applicant: Furuno Electric Co., Ltd., Hyogo (JP)

(72) Inventor: Masato Okuda, Kyoto (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 17/644,713

(22) Filed: Dec. 16, 2021

(65) Prior Publication Data

US 2022/0357158 A1 Nov. 10, 2022

(30) Foreign Application Priority Data

May 7, 2021 (EP) .................................... 21172787

(51) Int. Cl.
| | |
|---|---|
| *G01C 13/00* | (2006.01) |
| *B63B 49/00* | (2006.01) |
| *G06F 3/0481* | (2022.01) |
| *H04N 5/272* | (2006.01) |

(52) U.S. Cl.
CPC ............ *G01C 13/006* (2013.01); *B63B 49/00* (2013.01); *G06F 3/0481* (2013.01); *H04N 5/272* (2013.01)

(58) Field of Classification Search
None
See application file for complete search history.

(56) References Cited

U.S. PATENT DOCUMENTS

| | | | | |
|---|---|---|---|---|
| 9,182,239 | B2* | 11/2015 | Davis | ................... G01C 21/203 |
| 9,865,167 | B1* | 1/2018 | Liang | ....................... G08G 1/16 |
| 10,580,307 | B2* | 3/2020 | Yoshikawa | ........... G01S 13/937 |
| 2008/0163057 | A1* | 7/2008 | Lohi | ..................... G01C 21/20 |
| | | | | 715/18 |
| 2008/0294308 | A1* | 11/2008 | Watson | ................ G07C 5/0816 |
| | | | | 701/537 |
| 2009/0287409 | A1* | 11/2009 | Summers | ................ B63B 79/40 |
| | | | | 701/533 |

(Continued)

FOREIGN PATENT DOCUMENTS

| | | |
|---|---|---|
| WO | 2020045601 A1 | 3/2020 |
| WO | 2020045602 A1 | 3/2020 |

*Primary Examiner* — Haimei Jiang
(74) *Attorney, Agent, or Firm* — Alleman Hall Creasman & Tuttle LLP (57) ABSTRACT

A tidal current information display device for a movable body includes a position measurement module to detect a position of the movable body, a geographical information selection module to determine geographic information to be displayed on a display screen based on the detected position, a tidal current information receiving module to receive and store tidal current information based on the detected position, a tidal current information display module to generate display data for displaying a first graphical user interface (GUI) for displaying the tidal current information corresponding to a predetermined position on the geographic information displayed on the display screen, and a voyage time calculation module to calculate an estimated time for the movable body to reach the predetermined position. The first GUI is configured for showing at least one of: the estimated time and a direction and speed of a tidal current at the estimated time.

22 Claims, 5 Drawing Sheets

(56) References Cited

U.S. PATENT DOCUMENTS

| | | | | |
|---|---|---|---|---|
| 2012/0277941 | A1* | 11/2012 | Noffsinger | G08G 3/00 |
| | | | | 701/21 |
| 2014/0240313 | A1* | 8/2014 | Varga | H04N 13/383 |
| | | | | 345/419 |
| 2015/0314840 | A1* | 11/2015 | Okuda | G08G 3/00 |
| | | | | 340/984 |
| 2016/0091318 | A1* | 3/2016 | Silfven | G01C 21/203 |
| | | | | 701/439 |
| 2016/0123739 | A1* | 5/2016 | Okuda | B63B 49/00 |
| | | | | 701/537 |
| 2016/0127868 | A1* | 5/2016 | Okuda | H04W 4/70 |
| | | | | 370/329 |
| 2016/0265920 | A1* | 9/2016 | Yamaguchi | B63B 49/00 |
| 2017/0003128 | A1* | 1/2017 | Kono | G01W 1/00 |
| 2021/0156692 | A1* | 5/2021 | Moriwaki | G01C 21/203 |
| 2021/0185238 | A1* | 6/2021 | Seike | H04N 23/695 |
| 2021/0215486 | A1* | 7/2021 | Percy | G01C 21/203 |
| 2022/0214171 | A1* | 7/2022 | Johnson | B63B 79/40 |

* cited by examiner

TIDAL CURRENT INFORMATION DISPLAY DEVICE

CROSS-REFERENCE TO RELATED APPLICATION(S)

The application claims priority under 35 U.S.C. § 119 to European Patent Application No. EP21172787.0, which was filed in Europe on May 7, 2021, the entire disclosure of which is hereby incorporated by reference in its entirety.

TECHNICAL FIELD

The present disclosure mainly relates to a tidal current information display device, and more specifically to superimposing tidal current information on an image for navigation of a moveable body in water using augmented reality.

BACKGROUND

Tides have been known to influence a course of the marine vessel on water. Vessel navigating personnel, for example, a captain, crew, or other navigating personnel on-board the marine vessel may be unaware of when and how each tide may influence the course of the marine vessel. For example, in waters where tides may, or stated differently—are likely to, be encountered by the marine vessel, a position, direction and/or time at which the tides can occur may be unknown by the vessel navigating personnel and consequently, the vessel navigating personnel may be forced to choose or elect a sub-optimal course of travel for the marine vessel in such waters. Depending on a severity of, or by simply encountering, these tides over a prolonged period of time, these tides may contribute in negatively impacting a structural integrity and/or an operational performance of the marine vessel.

Some Augmented Reality (AR) based navigation systems have been developed in the past for assisting in the navigation of marine vessels. Traditionally, these systems have been depicting tidal information that is ineffective in helping navigating personnel to estimate one or more geographical conditions associated with the surroundings of the marine vessel, for example, conditions associated with a tidal current at a predetermined position in relation to a current position of the marine vessel. Such geographical conditions when estimated can facilitate the navigating personnel in monitoring operation of, and navigating, the marine vessel in a proper manner. For example, using the information pertaining to such geographical conditions, the navigating personnel can steer the marine vessel i.e., by adjusting a heading direction of the marine vessel effectively and in a timely manner, if needed, so that the heading direction is, for instance, based on the direction of the tidal current.

Moreover, when a ship intends to navigate around tidal zones of water bodies, the ship can obtain tidal current information from various sources, for example, using on-board sensing equipment or from an external source with use of a communication means such as satellite communication. However, even upon receiving the tidal information from each of these sources, the information from these sources is not fully integrated by many of the conventionally designed navigation systems for display in an effective manner and is therefore, rendered sub-optimal for intuitive use by navigating personnel.

Conventional Augmented Reality (AR) based navigation systems can display image information captured by an image sensor (camera) and information about surrounding ships and land acquired based on information captured by a sensor such as a radar, however, it is difficult to display the tidal current information by the conventional AR navigation system because the tidal information may not be necessarily obtained from the sensor of the own vessel, but from an external base through the communication equipment. In the current state of the art, there does not exist an AR based display system for navigation that is able to display tidal current information, especially when it is provided from a source other than one's own vessel, in a manner that can be intuitively grasped by the navigating personnel for use in navigating the ship.

For the aforementioned reasons, there is a need for providing a system and method that displays tidal current information on a display screen for assisting in the navigation of a marine vessel.

SUMMARY

In an embodiment of the present disclosure, there is provided a tidal current information display device, for a movable body, that includes a position measurement module, a geographical information selection module, a tidal current information receiving module, a tidal current information display module, and a voyage time calculation module. The position measurement module is configured to detect a position of the movable body. The geographical information selection module is configured to determine geographic information to be displayed on a display screen. The tidal current information receiving module is configured to receive and store tidal current information based on the detected position. The tidal current information display module is configured to generate display data for displaying a first graphical user interface (GUI) on the display screen for displaying the tidal current information corresponding to a predetermined position on the geographic information displayed on the display screen. The voyage time calculation module is configured to calculate an estimated time for the movable body to reach the predetermined position. The first GUI is configured for showing at least one of: the estimated time and a direction and speed of a tidal current at the estimated time.

Additionally, or optionally, the first GUI is configured for showing at least one of: a first gauge including the estimated time to reach the predetermined position and a direction and speed of the tidal current at the estimated time, a ship-shaped symbol for indicating an estimated heading direction of the movable body at the estimated time, and a first triangle-shaped indicator movable around a periphery of the first gauge for indicating a direction of the tidal current with respect to the estimated heading direction.

Additionally, or optionally, the first GUI is a pop-up balloon, and the tidal current information display module is configured to generate the display data for automatically displaying the first GUI on the display screen, when a condition is met, the condition includes at least one of: when a user performs a click operation, when the predetermined position is within a predetermined range from the detected position of the movable body, and when a number of GUIs on the display screen falls below a predetermined minimum threshold.

Additionally, or optionally, the tidal current information display module is configured to generate the display data for displaying a second GUI corresponding to the detected position of the movable body on the display screen, the second GUI configured for showing at least one of: a second gauge including a speed and direction of the tidal current at the detected position of the movable body, a ship-shaped symbol for indicating an actual heading direction of the movable body, a first triangle-shaped indicator movable around a periphery of the second gauge for indicating a direction of the tidal current with respect to the actual heading direction of the movable body, and a second triangle-shaped indicator fixed around the periphery of the second gauge for indicating an estimated time, upon expiry of which, the direction of tidal current changes.

Additionally, or optionally, the second GUI is a pop-up balloon, and the tidal current information display module is configured to generate the display data for automatically displaying the second GUI on the display screen, when a condition is met, the condition includes at least one of: when a user performs a click operation, and when a number of GUIs on the display screen falls below a predetermined minimum threshold.

Additionally, or optionally, the tidal current information display module is configured to generate the display data for displaying a third GUI corresponding to the predetermined position, wherein the third GUI is configured for showing a second triangle-shaped indicator for indicating a direction of the tidal current at the estimated time.

Additionally, or optionally, the predetermined position is at least one of: a port position, a pre-set position, a way-point set by a user, and a predicted position.

Additionally, or optionally, the tidal current information receiving module is configured to receive the tidal current information from one of: an external communication equipment and one or more sensors attached to the movable body.

Additionally, or optionally, the geographic information is one of: a geographical map and an image captured by an image sensor attached to the movable body.

Additionally, or optionally, the tidal current information display module is further configured to: superimpose the first, second and third GUIs on the image, and generate the display data for displaying the superimposed image on the display screen.

Additionally, or optionally, the tidal information display module is configured to maximize or minimize at least one of: the first, second, and third GUIs, when a condition is met, the condition includes at least one of: when a user performs a click operation, when the predetermined position exceeds a predetermined range from the detected position of the movable body, and when a number of GUIs on the image exceeds above a predetermined minimum threshold.

In another aspect of the present disclosure, there is provided an Augmented Reality (AR) based navigation apparatus for a movable body, that includes an image sensor, a position measurement module, a tidal current information receiving module, a tidal current information display module, and a voyage time calculation module. The image sensor is attached onto the movable body, and configured to capture an image, and output image data. The position measurement module is configured to detect a position of the movable body. The tidal current information receiving module is configured to receive and store tidal current information based on the detected position. The voyage time calculation module is configured to calculate an estimated time for the movable body to reach a predetermined position of a tidal current on the image displayed on the display screen. The tidal current information display module is configured to: generate display data for displaying a first graphical user interface (GUI) for displaying the tidal current information corresponding to the predetermined position of the tidal current on the display screen, generate the display data for displaying a second GUI on the display screen for displaying the tidal current information at the detected position of the movable body if the detected position of the movable body coincides with the predetermined position of the tidal current, superimpose the first and second GUIs on the image, and generate the display data for displaying the superimposed image on the display screen.

Additionally, or optionally, the first GUI is a pop-up balloon and is configured for showing: a first gauge including the estimated time to reach the predetermined position, a direction and a speed of the tidal current at the estimated time, and a ship-shaped symbol for indicating an estimated heading direction of the movable body at the estimated time, and a first triangle-shaped indicator movable around a periphery of the first gauge for indicating a direction of the tidal current with respect to the estimated heading direction.

Additionally, or optionally, the second GUI is a pop-up balloon and configured for showing: a second gauge including a speed and a direction of the tidal current at the detected position of the moveable body, and a ship-shaped symbol for indicating an actual heading direction of the movable body, a first triangle-shaped indicator movable around a periphery of the second gauge for indicating a direction of the tidal current with respect to the actual heading direction of the movable body, and a second triangle-shaped indicator fixed around the periphery of the second gauge for indicating an estimated time, upon expiry of which, the direction of tidal current changes.

In yet another aspect of the present disclosure, there is provided a method for displaying tidal current information for a movable body on an image displayed on a display screen. The method includes capturing an image and generating image data, detecting a position of the movable body, receiving and storing tidal current information based on the detected position, calculating an estimated time for the movable body to reach a predetermined position, generating display data for displaying a first graphical user interface (GUI) for displaying the tidal current information corresponding to the predetermined position on the image displayed on the display screen, generating the display data for displaying a second graphical user interface (GUI) for displaying the tidal current information at the detected position of the movable body if the detected position of the movable body coincides with the predetermined position of the tidal current, superimposing the first and second GUIs on the image, and generating the display data for displaying the superimposed image on the display screen.

In yet another aspect of the present disclosure, there is provided a non-transitory computer readable medium having stored thereon computer-executable instructions which, when executed by a computer, cause the computer to capture an image and generating image data, detect a position of the movable body, receive and store tidal current information based on the detected position, calculate an estimated time for the movable body to reach a predetermined position, generate display data for displaying a first graphical user interface (GUI) for displaying the tidal current information corresponding to the predetermined position on the image displayed on the display screen, generate the display data for displaying a second graphical user interface (GUI) on the display screen for displaying the tidal current information at the detected position of the movable body if the detected position of the movable body coincides with the predetermined position of the tidal current, superimpose the first and second GUIs on the image, and generate the display data for displaying the superimposed image on the display screen.

In the above-mentioned embodiments of the present disclosure, there is provided processing circuitry included in a tidal current information display device or in an augmented reality (AR) based navigation apparatus for a movable body, that includes: a position measurement module, a geographical information selection module, a tidal current information receiving module, a voyage time calculation module, and a tidal current information display module, and any function of each module shall be performed by the processing circuitry.

The problem of not being able to display tidal current information that can be intuitively used by the navigating personnel of the ship is solved by using a tidal current information display device that depicts the tidal current information for predetermined positions, in the sea, in relation to the detected position of the ship. Accordingly, the tidal current information display device of the present disclosure offers to present the tidal current information to the navigating personnel for use in a highly intuitive manner.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION OF THE EMBODIMENTS

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 1:
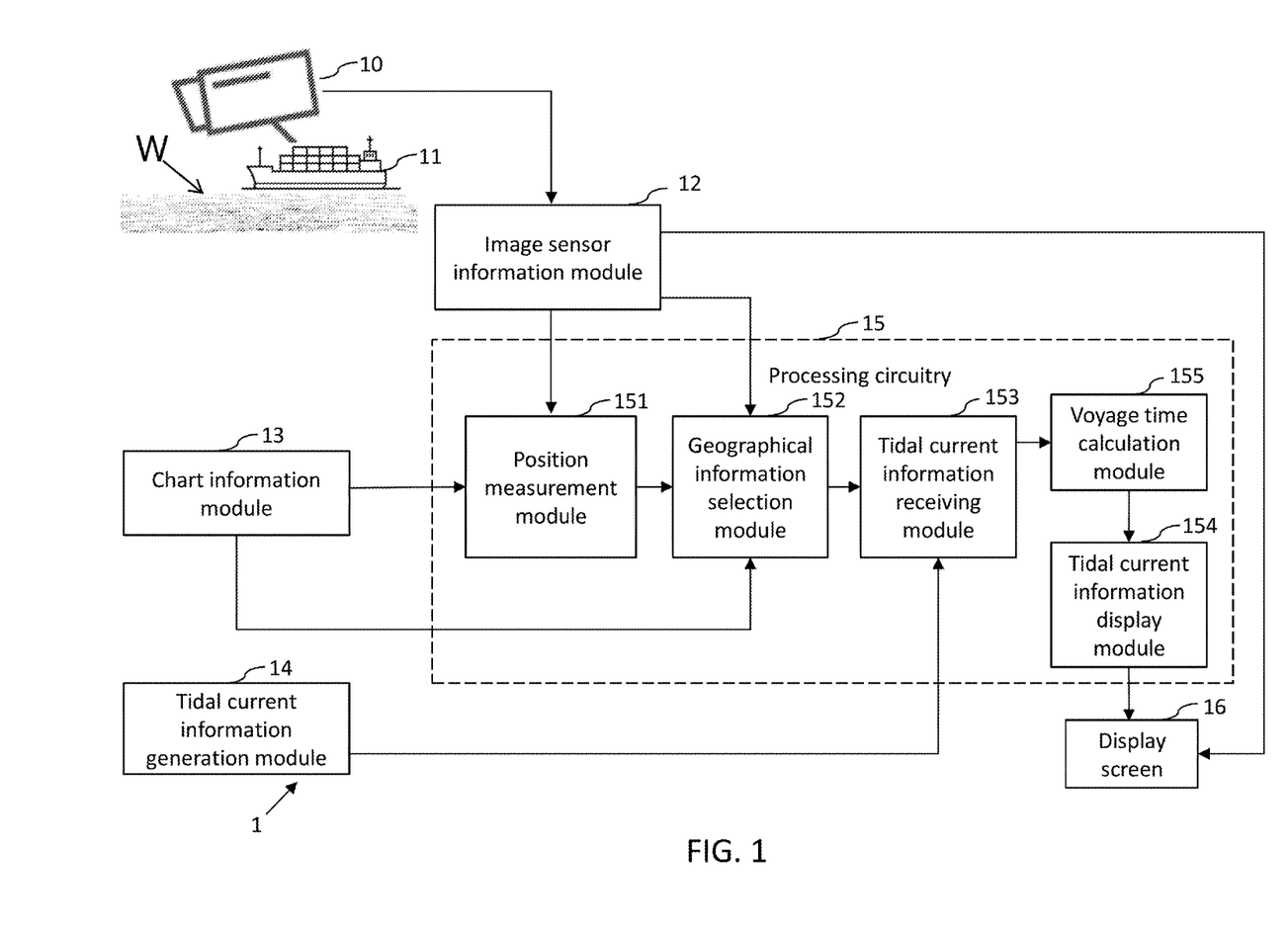
FIG. 1 is a block diagram illustrating an entire configuration of a tidal current information display device for a movable body in which an image sensor is attached to the movable body according to one embodiment of the present disclosure.
Figure 2:
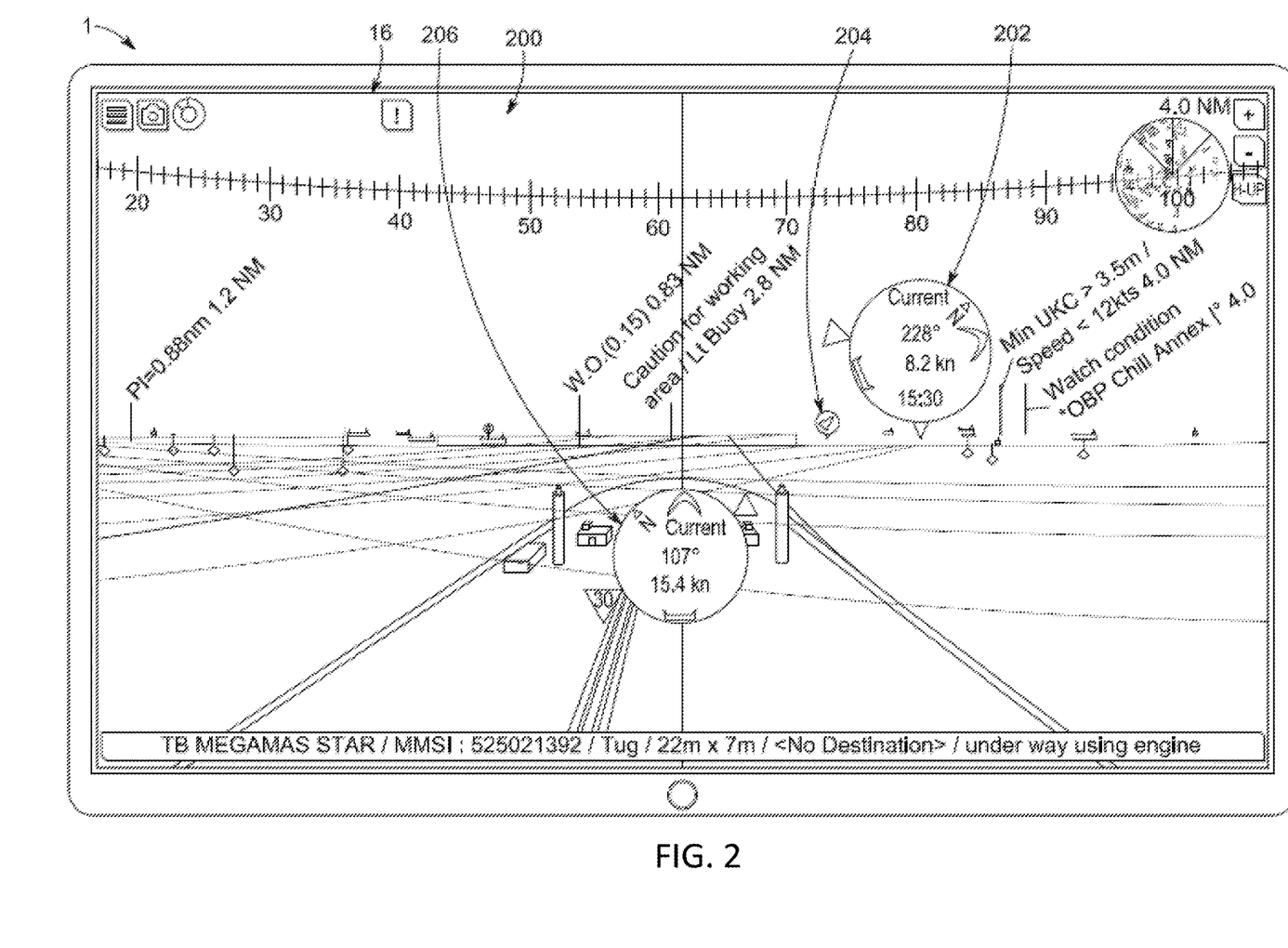
FIG. 2 illustrates a superimposed camera image of a region including the movable body and showing a first graphical user interface (GUI), a second GUI, and a third GUI.
Figure 3:
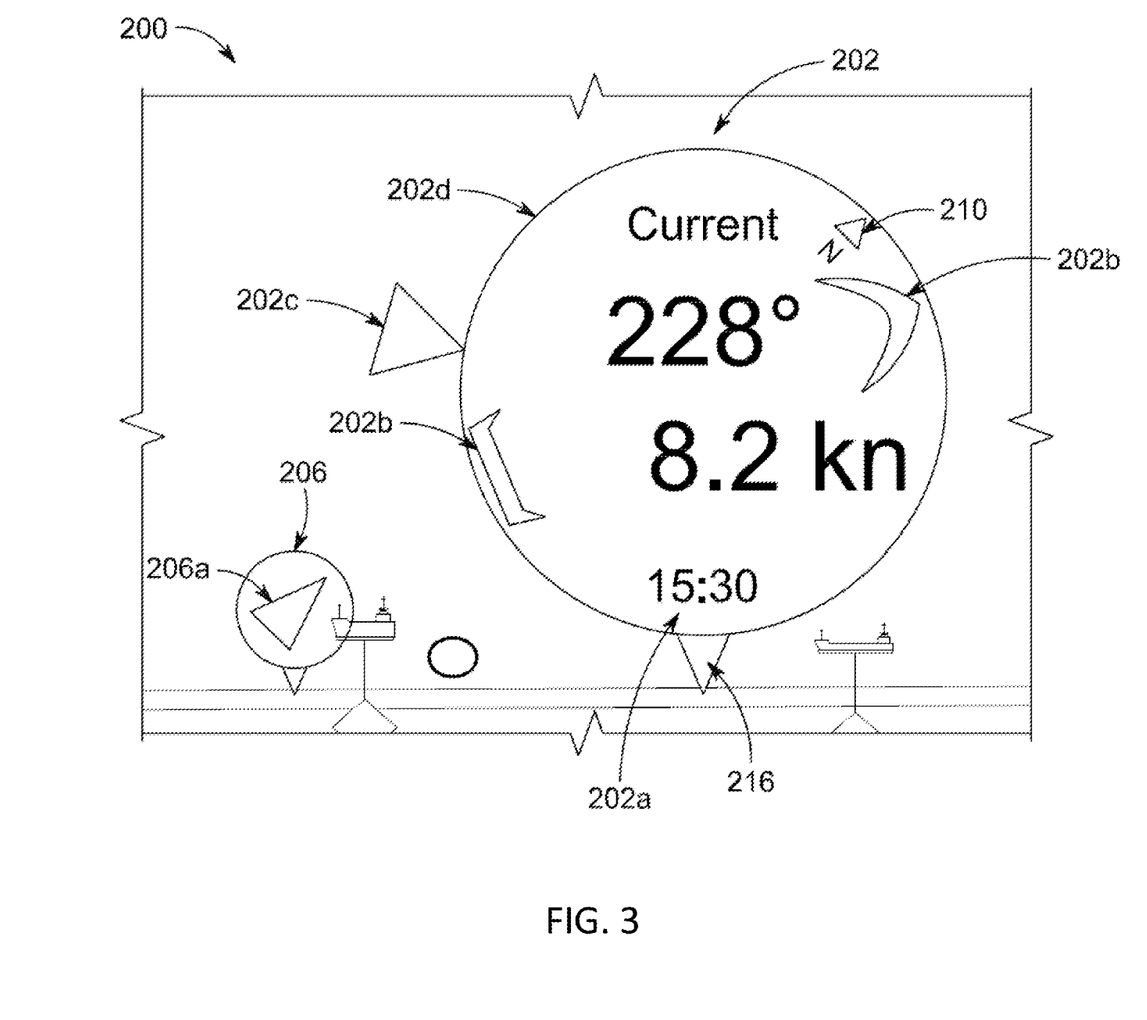
FIG. 3 illustrates an enlarged view of the superimposed image from FIG. 2 showing information presented by the first GUI and the third GUI respectively.
Figure 4:
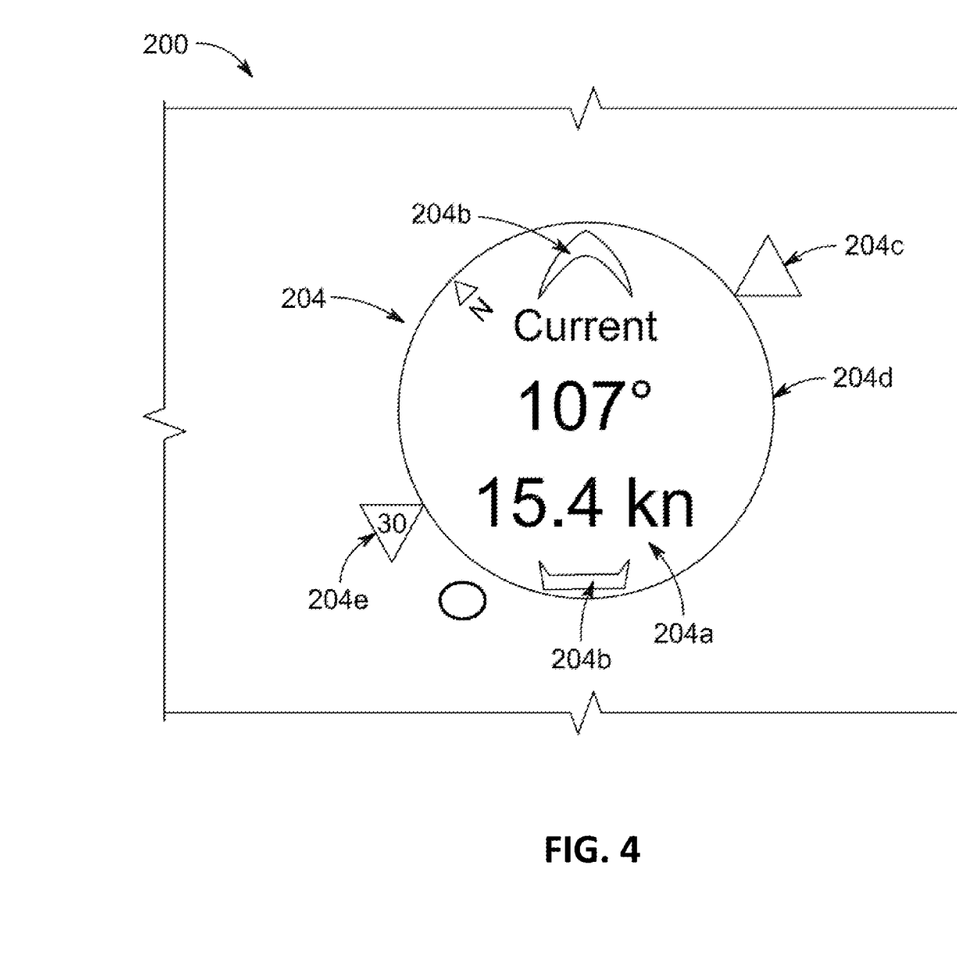
FIG. 4 illustrates an enlarged view of the superimposed image from FIG. 2 showing information presented by the second GUI.

FIG. 1 is a block diagram illustrating an entire configuration of a tidal current information display device 1 in which an image sensor 10 is attached to a movable body 11 according to one embodiment of the present disclosure. FIG. 2 illustrates a superimposed camera image 200 of a region including the movable body 11 and showing a first GUI 202, a second GUI 204, and a third GUI 206. FIG. 3 illustrates an enlarged view of the superimposed image 200 from FIG. 2 showing information presented by the first GUI 202 and the third GUI 206 respectively. FIG. 4 illustrates an enlarged view of the superimposed image from FIG. 2 showing information presented by the second GUI 204.

Next, mainly referring to FIG. 1, the image sensor 10 (hereinafter also referred to as camera 10) may be attached to the movable body 11 (hereinafter also referred to as ship 11).

The tidal current information display device 1 may be located on-board the ship 11 and provided with, or in electrical connection to, the camera 10 as the ship instrument for purposes as will be explained in detail later herein.

The camera 10 may be configured as, for example, a limited-viewing angle or a wide-angle video camera which images the water surface W in the vicinity, or around at least a portion of the perimeter of the ship 11. This camera 10 may have a live output function, capable of generating video data (image data) as the imaged result in real time, and outputting it to a display screen 16. As illustrated in FIG. 1, the camera 10 may be installed in the ship 11 so that an imaging direction generally faces onto the water surface W forward of the hull.

The camera 10 may be attached to the ship 11 through a rotating mechanism (not illustrated) and, therefore, the imaging direction can be changed in a given angle range on the basis of the hull of the ship 11, for example, by inputting one or more commands via the display device 1 for instructing a panning/tilting of the camera 10.

The tidal current information display device 1 may be provided with, or be communicatively coupled to, the display screen 16 for generating an image 200 expressing the situation around the movable body 11 using Augmented Reality (AR) based on, among other things, a detected position of the ship 11 as will be explained later herein, and superimposing a GUI 202/204/206 on the image 200 corresponding to a predetermined position of a tide on the image.

The display screen 16 may be configured as, for example, a display screen that forms part of a navigation assisting device to which a ship operator who operates the ship 11 refers. However, the display screen 16 is not limited to the above configuration, and, for example, it may be a display screen for a portable computer which is carried by a ship operator's assistant who monitors the surrounding situation from the ship 11, a display screen for a passenger to watch in the cabin of the ship 11, or a display part for a head mounted display, such as a wearable glass, worn by a passenger. In an embodiment of the present disclosure, the camera 10, the tidal current information generation module 14, and the display screen 16 are external to the display device 1. In another embodiment of the present disclosure, the camera 10, the tidal current information generation module 14, and the display screen 16 are an integral part of the display device 1. Alternatively, the camera 10, the tidal current information generation module 14, the display screen 16 and the tidal current information display device 1 may integrally form an Augmented Reality (AR) based navigation apparatus that autonomously, or at least semi-autonomously facilitates a user to, navigate the ship 11 across the sea. The AR based navigation apparatus enables the user to navigate the ship 11 by superimposing tidal current information, in real-time, on live images of surroundings of the ship 11 in a manner which is easy for a user to comprehend.

The tidal current information display device 1 may also be connected to variety of peripheral devices including, but not limited to, a keyboard and a mouse which the user may operate for performing various functions pursuant to functionalities in the present disclosure. For example, the user can provide various kinds of instructions to the AR based tidal current information display device 1 and the camera 10 about generation of an image by operating the keyboard and/or the mouse. The instructions may include the pan/tilt operation of the camera 10, setting of displaying or not-displaying of various types of information, and a setup of a viewpoint from which the image is captured.

The tidal current information display device 1 may further be connected to a tidal current information generation module 14 that is configured to generate tidal current information including position of a tide on the water surface W. The tidal current information generation module 14 may include an external communication equipment, for example, a land station, a Global Navigation Satellite System (GNSS) receiver, an Electronic Chart Display and Information System (ECDIS), an Automated Identification System (AIS) receiver, a radar device etc. In addition to the position of the tide, the tidal current information may further include a present speed and direction of the tide, or a speed and direction of the tide at an estimated (future) time, i.e., when the ship 11 is estimated to reach the predetermined position of the tide as will be evident from the appended disclosure. Additionally, or optionally, the tidal current information generation module 14 may include one or more sensors attached to the ship 11. These sensors may include GNSS receivers, AIS systems, or other peripheral devices that form part of the on-board ship equipment for detecting tides and/or measuring their pertinent tidal current information. The tidal current information generating module 14 is configured to generate the tidal current information with respect to a reference axis of the map 200 (for example, with respect to the meridian plane denoted by reference numeral 210 and as shown best in the view of FIG. 3) which means that the tidal current information generation module 14 is configured to store chart/global co-ordinates of the tides in the region.

Additionally, or optionally, as shown in FIG. 1, the tidal current information display device 1 may be connected with, and hence in communication with, an image data and sensor information module 12 and a chart information module 13 for realizing functionalities that are consistent with the present disclosure.

With continued reference to FIG. 1, the tidal current information display device 1 includes processing circuitry 15. The image data and sensor information module 12 may be configured to receive an image captured by the image sensor 10, and output the image data to the display screen 16. Further, the image data and sensor information module 12 may also be configured to receive and store image sensor information including a position and an azimuthal orientation of the image sensor 10 with respect to a reference axis of a global geographical map. The image sensor 10 is installed on the ship 11. While capturing images (and for sake of clarity in this disclosure), a position of the image sensor 10 may be assumed to be deduced from, for example, a position of the ship 11 in the map and the azimuthal orientation of the image sensor 10 may be assumed from, for example, a heading direction of the ship 11 with respect to a meridian plane (denoted by reference numeral 210 in the view of FIG. 3).

The processing circuitry 15 of the tidal current information display device 1 includes a position measurement module 151 that is configured to detect the position of the ship 11. To do so, the position measurement module 151 may receive the positional information of the ship 11 from the chart information receiving module 13. The chart information module 13 may be configured to receive and store the global geographical map, or another specified geographical map for the region, based on electronic nautical chart information that may be known beforehand to the chart information module 13.

The position measurement module 151 is configured to detect the position of the ship 11 via any external equipment, for example, a land station or an on-board sensing system such as, but not limited to, a Global Navigation Satellite System (GNSS) receiver, an Electronic Chart Display and Information System (ECDIS), an Automated Identification System (AIS) receiver, a radar device, a sonar etc.

The geographical information selection module 152 is configured to determine geographic information to be displayed on the display screen 16 based on the position of the ship 11 detected by the position measurement module 151. In one embodiment, the geographic information may include the geographical map of a region including the ship 11, or a geographical map of a region corresponding to a field of view of the image sensor 10. In another embodiment, the geographic information may include the image captured by the image sensor 10 that is attached to the ship 11.

The tidal current information receiving module 153 is configured to receive and store tidal current information based on the detected position of the ship 11. The tidal current information receiving module 153 may be disposed in communication with the tidal current information generation module 14 to receive relevant tidal current information based on the position of the ship 11 detected by the position measurement module 151.

Referring to FIGS. 1, 2 and 3, the tidal current information display module 154 is configured to generate display data for displaying a first graphical user interface (GUI) 202 on the display screen 16 for displaying the tidal current information corresponding to a predetermined position, for example — predetermined position of a tide, on the geographic information that is displayed on the display screen 16. Also, the processing circuitry 15 of the tidal current information display device 1 includes a voyage time calculation module 155 that is configured to calculate an estimated time for the movable body 11 to reach the predetermined position. The first GUI 202 is configured for showing at least one of: the estimated time and a direction and speed of a tidal current at the estimated time.

In one embodiment, as illustrated in FIGS. 2 and 3, the first GUI 202 is a pop-up balloon. In this embodiment, the tidal current information display module 154 is configured to generate the display data for displaying the pop-up balloon on the display screen 16 when a condition is met. In a further embodiment, the condition is met when a user performs a click operation. The term 'click operation' disclosed herein may be performed by the user using a tactile interface on the display screen 16 of the display device 1, or alternatively, by use of other peripheral devices, for example, an input receiving module (not shown) such as a keyboard or a mouse that may be connected to the display device. The user may request the display device 1 to display the first GUI 202 to be displayed on the predetermined position that corresponds to a tide in the image 200 obtained from the image sensor 10.

In another embodiment, the first GUI 202 may be configured to appear on the image 200 corresponding to the predetermined position of the tide when the predetermined position of the tide is within a predetermined range, for example, less than 5 nautical miles, from the detected position of the ship 11.

In yet another embodiment, the first GUI 202 may be displayed when a number of GUIs on the image falls below a predetermined minimum threshold, for example, less than 3 GUIs corresponding to when three tides may be present in the region and the image 200, captured by the image sensor 10, correspondingly shows the three tides but has tidal current information pertaining to one or more of the three tides missing therefrom.

In an embodiment, referring to FIG. 2 and as best shown in the view of FIG. 3, the first GUI 202 is configured for showing a first gauge 202a including the estimated time to reach the predetermined position, for example, of the tide and a direction and speed of the tidal current at the estimated time. Further, the first GUI 202 may also be configured to show a ship-shaped symbol 202b therein i.e., within a periphery 202d of the first gauge 202a for indicating an estimated heading direction of the movable body 11 at the estimated time. Furthermore, the first GUI 202 may also be configured to show a first triangle-shaped indicator 202c movable around the periphery 202d of the first gauge 202a for indicating a direction of the tidal current, for example, an imminent/oncoming tide with respect to the estimated heading direction of the ship 11.

Additionally, referring to FIGS. 1-2 and as best shown in the enlarged view of the image 200 in FIG. 4, the tidal current information display module 154 is also configured to generate the display data for displaying a second GUI 204 corresponding to the detected position of the movable body 11 on the display screen 16. In embodiments herein, it has been contemplated that the second GUI 202 may be generated automatically by the tidal current information display module 154 for displaying the tidal current information at the detected position of the movable body 11 if the detected position of the movable body 11 coincides with the predetermined position of the tidal current, for example, when the movable body 11 is located directly overhead, or above, the tidal current and such position of the movable body 11 is detected as being coincident with the predetermined position of the tide from the image 200 on the display screen 16 (see FIGS. 2 and 4) to indicate that the tide is currently located directly underneath the movable body 11.

Additionally, in an embodiment, as illustrated in FIGS. 2 and 3, the second GUI 204 is a pop-up balloon. In this embodiment, the tidal current information display module 154 is configured to generate the display data for displaying the pop-up balloon on the display screen 16 when a condition is met. In an embodiment, the condition for displaying the second GUI 204 may be met when the user performs a click operation. As disclosed earlier herein in conjunction with the first GUI 204, the term 'click operation' may be performed by the user using a tactile interface on the display screen 16 of the display device 1, or alternatively, by use of other peripheral devices, for example, an input receiving module (not shown) such as a keyboard or a mouse that may be connected to the display screen 16 of the display device 1.

In another embodiment, the second GUI 204 may also be, additionally i.e., in addition to the first GUI 202, or optionally, displayed when a number of GUIs on the image falls below a predetermined minimum threshold, for example, less than 3 GUIs corresponding to when three tides may be present in the region and the image 200, captured by the image sensor 10, correspondingly shows the three tides but has tidal current information pertaining to one or more of the three tides missing therefrom.

In an embodiment, referring to FIG. 2 and as best shown in the view of FIG. 4, the second GUI 204 is configured for showing a second gauge 204a for including a speed and direction of the tidal current at the detected position of the movable body i.e., when the moveable body 11 is directly above, or overhead with respect to, the tidal current, or stated differently, the tidal current is directly underneath the moveable body 11 as such state of the surroundings of the ship 11 would accordingly be represented by the image 200 displayed on the display screen 16. by the detected position of the ship 11 being coincident, or overlapping, with that of the position of the tidal current.

Further, the second GUI 204 may also be configured to show another ship-shaped symbol 204b for indicating an actual heading direction of the movable body 11. The terms "actual heading direction" used herein may be regarded as the current, or present, heading direction of the ship 11.

Furthermore, the second GUI 204 may also be configured to show a first triangle-shaped indicator 204c movable around a periphery 204d of the second gauge 204a for dynamically indicating a direction of the tidal current with respect to the actual heading direction of the movable body 11.

Still further, the second GUI 204 may also be configured to show a second triangle-shaped indicator 204e fixed around the periphery 204d of the second gauge 204a for indicating an estimated time, upon expiry of which, the direction of tidal current changes. By way of an example in FIG. 4, the second triangle-shaped indicator 204e is displaying a numeral '30' indicating that a direction of the tide, or the tidal current, would change from that depicted by way of the first triangle-shaped indicator 204c to the direction depicted by the second triangle-shaped indicator 204e and such change in direction of the tide would occur in a period of 30 minutes from a present time. It is to be noted that the numeral "30" may be decremented by 1 at a predefined interval by default or set by a user. In an example, the predefined interval may be 30 seconds, or 1 minute or 10 minutes, or a combination thereof. In an example, the numeral '30' may be decremented by 10 at every 10 minutes for the first 20 minutes, and then decremented by 1 every 1 minute, for the next 10 minutes; 30 → 20 → 10 → 9 → . . . → 1.

Although it is disclosed herein that the second triangle-shaped indicator 204e is used to depict the change in direction of the tide, or tidal current, and the concomitant time in which such change in direction is likely to occur, such a case is explanatory in nature and hence, non-limiting of this disclosure. In an alternative embodiment, the second triangle-shaped indicator 204e may be indicative of an altogether different tide that is subsequent in position to a tide is being currently encountered by the ship 11 i.e., as indicated by the first triangle-shaped indicator 204c. Accordingly, it will be acknowledged by persons skilled in the art that alternate interpretations for the specific meanings of each symbol herein, for instance, the second triangle-shaped indicator 204e may be possible in lieu of that disclosed herein without deviating from the spirit of the present disclosure.

Still further, turning back to FIGS. 1-3, in an embodiment, the tidal current information display module 154 may also be configured to generate the display data for displaying a third GUI 206 corresponding to the predetermined position, for example, of yet another tide on the image 200 displayed on the display screen 16. In this embodiment, the third GUI 206 may be implemented by way of a minimized version of an actual/full GUI (such as one of the first or second GUIs 202/204). The tidal current information display module 154 may superimpose this minimized version of the GUI i.e., the third GUI 206 on the image 200 for indicating a direction of the tide.

Referring mainly to FIG. 1, in embodiments herein and also as best shown in the view of FIGS. 2-4, the tidal current information display module 154 is generally configured to superimpose each of the first GUI 202, the second GUI 204, and the third GUI 206 on the image 200 and display the superimposed image 200 on the display screen 16. The tidal information display module 154 is configured to maximize or minimize at least one of: the first, second, and third GUIs 202, 204, and 206, when a condition is met, the condition includes at least one of: when a user performs a click operation, when the predetermined position exceeds a pre-determined range from the detected position of the movable body 11, and when a number of GUIs on the image exceeds above a predetermined minimum threshold.

In an embodiment, the predetermined position disclosed herein may be a port position. In another embodiment, the predetermined position may include a pre-set position, for example, a geographical location in the sea. In yet another embodiment, the predetermined position may include one or more way-points (WP) set by a user. For example, these group or set of way-points may be located on a course that the ship 11 is intended to travel on. In yet another embodiment, the pre-determined position may include a predicted position, for example, a vector based pre-calculated position on the image 200 to correspond with a possible tide location and as requested by the user of the display screen 16. The predicted position may be calculated based on a speed and a direction of the ship 11 in consideration with a current velocity of the ship 11 using any known conventional technique.

With implementation of embodiments herein, the tidal current information display module 154 outputs the first, second and third GUIs 202, 204 and 206 to the display screen 16 for superimposing these GUIs 202, 204 and 206 onto the image 200 that is captured by the image sensor 10 and for displaying the superimposed image on the display screen 16 of the display device 1. This way, the display device 1 of the present disclosure can beneficially provide information about positions of, and the pertinent tidal current information, associated with each of the tides with respect to the estimated time when the ship 11 reaches the predetermined positions and based on the actual, or estimated, heading direction of the ship 11 in a manner that is easy for a user to visualize and comprehend therefrom.

In the context of the present disclosure, the processing circuitry 15 includes a processor, computer, microcontroller, or other circuitry that controls the operations of various components such as an operation panel, and a memory. The processing circuitry 15 may execute software, firmware, and/or other instructions, for example, that are stored on a volatile or non-volatile memory, or otherwise provided to the processing circuitry 15.

Although the GUIs 202, 204 and 206 are shown to correspond with respective ones of three tides on the image 200, it would be apparent to one of ordinary skill in the art that based on the geographical information at the geographical information selection module 152 and the tidal current information at the tidal current information receiving module 153, the tidal current information display module 154 may select fewer or more than three tides and superimpose the selected tides with a corresponding number of GUIs as opposed to that appropriated, and exemplarily shown, in the view of FIG. 2.

A scope of the on-board ship equipment (information source for the position measurement module 151 and/or the geographical information selection module 152) connected to the display device 1 is not limited to any of the configurations that have been disclosed herein, and other types of instruments may be included to form part of the on-board ship equipment without limiting the scope of the present disclosure.

Further, the present disclosure is applicable not only to the ship which travels on the sea, but may also be applicable to arbitrary water-surface movable bodies which can travel, for example, on a lake, or a river.

Figure 5:
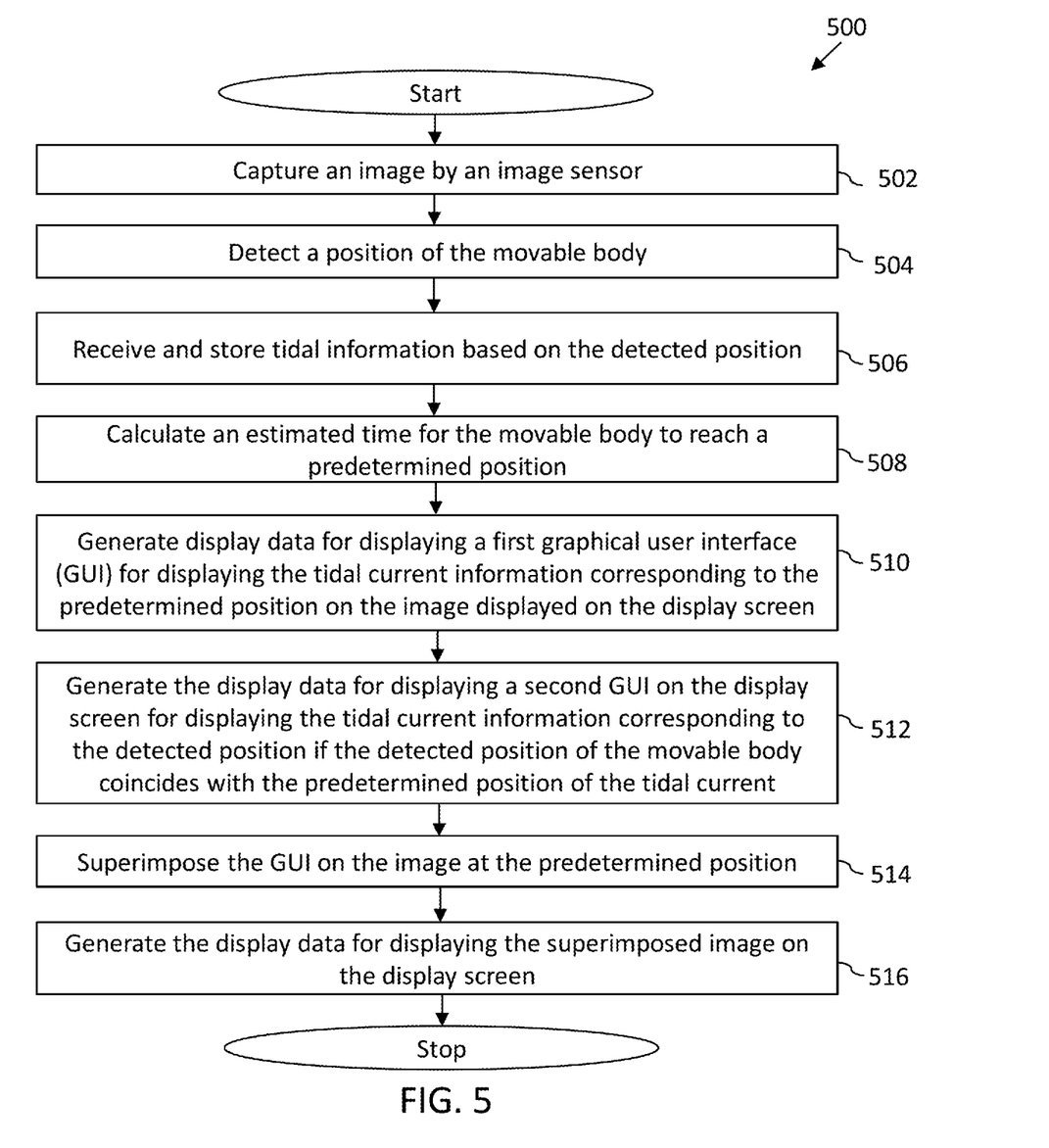
FIG. 5 is a flowchart illustrating a method for superimposing tidal current information on an image displayed on a display screen, in accordance with an embodiment of the present disclosure.

FIG. 5 is a flowchart illustrating a method 500 for displaying tidal current information for a movable body on an image displayed on a display screen.

At step 502, the image sensor 10 is configured to capture an image, and output image data.

At step 504, the position measurement module 151 is configured to detect a position of the movable body.

At step 506, the tidal current information receiving module 153 is configured to receive and store tidal current information based on the detected position.

At step 508, the voyage time calculation module 155 is configured to receive and store tidal current information based on the detected position.

At step 510, the tidal current information display module 154 is configured to generate the display data for displaying a first graphical user interface (GUI) 202 for displaying the tidal current information corresponding to a predetermined position on the image displayed on the display screen 16.

At step 510, the tidal current information display module 154 is configured to generate the display data for displaying a second GUI 204 on the display screen 16 for displaying the tidal current information corresponding to the detected position if the detected position of the movable body 11 coincides with the predetermined position of the tidal current.

At step 514, the tidal current information display module 154 is further configured to superimpose the GUI on the image at the predetermined position.

At step 516, the tidal current information display module 154 is configured to generate the display data for displaying the superimposed image on the display screen 16.

Terminology

Not all objectives or effects/advantages can be achieved in accordance with any particular embodiment described herein. Thus, for example, those skilled in the art will appreciate that certain embodiments will be taught herein without necessarily achieving other objectives or effects/advantages as taught or suggested herein. You will conclude that it may be configured to work to achieve or optimize one or more effects/benefits.

All processes described herein can be embodied by software code modules executed by a computing system that includes one or more computers or processors and can be fully automated. The code modules can be stored on any type of non—transitory computer-readable medium or other computer storage device. Some or all methods may be embodied in dedicated computer hardware.

It is clear from the present disclosure that there are many s other than those described herein. For example, depending on the embodiment, any particular action, event, or function of any of the algorithms described herein may be performed in different sequences and may be added, merged, or excluded altogether. (For example, not all described actions or events are required to execute the algorithm). Moreover, in certain embodiments, operations or events are performed in parallel rather than sequentially, for example through multithreading, interrupt handling, or through multiple processors or processor cores, or on other parallel architectures. Can be done. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but instead, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. Processors can also be a combination of computing devices, such as a digital signal processor (digital signal processor) and microprocessor combination, multiple microprocessors, one or more microprocessors in combination with a DSP core, or any other of that. It can be implemented as such a configuration, Although described primarily with respect to digital technology herein, the processor may also include primarily analog devices. For example, some or all of the signal processing algorithms described herein can be implemented by, analog circuits or mixed analog and digital circuits. Computing environments include, but are not limited to, any type of computer system that is based on a microprocessor, mainframe computer, digital signal processor, portable computing device, device controller, or computing engine within the device. be able to.

Unless otherwise stated, conditional languages such as "can," "can," "will," or "potentially" include other features, elements, and/or steps in a particular embodiment. Embodiments are understood in the context commonly used to convey that they do not include. Thus, such conditional languages are generally any method in which features, elements and/or steps are required for one or more embodiments, or one or more embodiments are these features. It does not mean that the elements and/or steps are included in any particular embodiment or necessarily include logic to determine whether they are performed.

Disjunctive languages, such as the phrase "at least one of X, Y, Z," have items, terms, etc. of X, Y, Z, or any combination thereof, unless otherwise stated. It is understood in the context commonly used to indicate that it can be (e.g. X, Y, and Z). Thus, such a disjunctive language generally requires at least one of X, at least one of Y, or at least one of Z, each of which has a particular embodiment.

Any process description, element or block in the flow diagram described herein and/or shown in the accompanying drawings is one or more executable instructions for implementing a particular logical function or element in the process. Should be understood as potentially representing a module, segment, or part of code, including. Alternative embodiments are included within the scope of the embodiments described herein, where the element or function is substantive, depending on the functionality involved, as will be appreciated by those skilled in the art. Can be performed simultaneously or in reverse order, deleted from those illustrated or described, in no particular order.

Unless otherwise stated, a numeral such as "one" should generally be construed as containing one or more described items. Thus, terms such as "one device configured to" are intended to include one or more listed devices. One or more of such enumerated devices can also be collectively configured to perform the stated citations. For example, "processors configured to run A, B, and C below" are a first processor configured to run A and a second processor configured to run B and C. Can include processors with. In addition, even if a specific number enumeration of the introduced examples is explicitly enumerated, those skilled in the art will appreciate that such enumeration is typically at least the enumerated number (eg, other modifiers). A mere enumeration of "two enumerations" without the use should be interpreted, to mean at least two enumerations, or two or more enumerations).

In general, the terms used herein should generally be construed as "non-limiting" terms (e.g., the term "including" should be construed as "not only that, but at least including" and " . . . " The term "has" should be interpreted as "having at least", and the term "including" should be interpreted as "including, but not limited to,"). Those skilled in the art will judge that this is the case.

For purposes of illustration, the term "horizontal" as used herein refers to a plane or plane parallel to the floor or surface of the area in which the system being described is used, regardless of its orientation. The method to be performed is defined as the plane on which it is performed. The term "floor" can be replaced with the term "ground" or "water surface", The term "vertical/vertical" refers to the direction perpendicular/vertical to the defined horizon. Terms such as "upper", "lower", "lower", "upper", "side", "higher", "lower", "upper", "beyond", and "lower" are defined for the horizontal plane.

The terms "attach", "connect", "pair" and other related terms used herein are also intended to denote features such as being removable, movable, fixed, and adjustable, unless otherwise noted. And/or should be construed as including removable connections or connections. Connections/connections include direct connections and/or connections with an intermediate structure between the two components described.

Unless otherwise stated, numbers preceded by terms such as "approximately," "about," and "substantially," as used herein, include enumerated numbers, and further. Represents an amount close to the stated amount that performs the desired function or achieves the desired result. For example, "approximately," "about," and "substantially" mean values less than 10% of the stated values, unless otherwise stated. As used herein, the features of the embodiments in which terms such as "approximately," "about," and "substantially" are previously disclosed perform further desired functions. Or represent a feature that has some variability to achieve the desired result for that feature.

Many modifications and modifications can be added to the embodiments described above, and their elements should be understood as being among other acceptable examples. All such modifications and modifications are intended to be included within the scope of the present disclosure and are protected by the following claims.

What is claimed is:

1. A tidal current information display device for a movable body, comprising:
    processing circuitry configured to:
        detect a position of the movable body via a positional sensing system;
        determine geographic information to be displayed on a display screen based on the detected position;

receive and store tidal current information based on the detected position;

generate display data for displaying the tidal current information corresponding to a predetermined position on the geographic information displayed on the display screen;

calculate an estimated time for the movable body to reach the predetermined position; and display a first graphical user interface (GUI) on the display screen based on the generated display data, wherein the first GUI is configured for showing:
the estimated time,
a first gauge including the estimated time to reach the predetermined position and a direction and speed of a tidal current at the estimated time, and
a first triangle-shaped indicator movable around a periphery of the first gauge for indicating a direction of the tidal current with respect to an estimated heading direction of the movable body at the estimated time.

2. The tidal current information display device of claim 1, wherein the first GUI is further configured for showing
a ship-shaped symbol for indicating the estimated heading direction of the movable body at the estimated time.

3. The tidal current information display device of claim 2, wherein
the first GUI is a pop-up balloon; and
the processing circuitry is further configured to generate the display data for automatically displaying the first GUI on the display screen, when a condition is met, the condition includes at least one of:
when a user performs a click operation,
when the predetermined position is within a predetermined range from the detected position of the movable body, and
when a number of GUIs on the display screen falls below a predetermined minimum threshold.

4. The tidal current information display device of claim 1, wherein
the processing circuitry is further configured to generate the display data for displaying a second GUI corresponding to the detected position of the movable body on the display screen,
the second GUI being configured for showing at least one of:
a second gauge including a speed and direction of the tidal current at the detected position of the movable body,
a ship-shaped symbol for indicating an actual heading direction of the movable body,
a first triangle-shaped indicator movable around a periphery of the second gauge for indicating a direction of the tidal current with respect to the actual heading direction of the movable body, and
a second triangle-shaped indicator fixed around the periphery of the second gauge for indicating an estimated time, upon expiry of which, the direction of tidal current changes.

5. The tidal current information display device of claim 4, wherein
the second GUI is a pop-up balloon, and
the processing circuitry is further configured to generate the display data for automatically displaying the second GUI on the display screen, when a condition is met, the condition includes at least one of:
when a user performs a click operation, and
when a number of GUIs on the display screen falls below a predetermined minimum threshold.

6. The tidal current information display device of claim 1, wherein
the processing circuitry is further configured to generate the display data for displaying a third GUI corresponding to the predetermined position, wherein
the third GUI is configured for showing a second triangle-shaped indicator for indicating a direction of the tidal current at the estimated time.

7. The tidal current information display device of claim 1, wherein
the predetermined position is at least one of:
a port position,
a pre-set position,
a way-point (WP) set by a user, and
a predicted position.

8. The tidal current information display device of claim 1, wherein
the processing circuitry is further configured to receive the tidal current information from one of:
an external communication equipment, and
one or more sensors attached to the movable body.

9. The tidal current information display device of claim 1, wherein
the geographic information is one of:
a geographical map, and
an image captured by an image sensor attached to the movable body.

10. The tidal current information display device of claim 9, wherein
the processing circuitry is further configured:
to superimpose the first GUI on the image; and
to generate the display data for displaying the superimposed image on the display screen.

11. The tidal current information display device of claim 10, wherein
the processing circuitry is further configured to maximize or minimize the first GUI, when a condition is met, and
the condition includes at least one of:
when a user performs a click operation,
when the predetermined position exceeds a predetermined range from the detected position of the movable body, and
when a number of GUIs on the image exceeds above a predetermined minimum threshold.

12. The tidal current information display device of claim 2, wherein
the processing circuitry is further configured to receive the tidal current information from one of:
an external communication equipment, and
one or more sensors attached to the movable body.

13. The tidal current information display device of claim 3, wherein
the processing circuitry is further configured to receive the tidal current information from one of:
an external communication equipment, and
one or more sensors attached to the movable body.

14. The tidal current information display device of claim 4, wherein
the processing circuitry is further configured to receive the tidal current information from one of:
an external communication equipment, and
one or more sensors attached to the movable body.

15. The tidal current information display device of claim 5, wherein
the processing circuitry is further configured to receive the tidal current information from one of:
an external communication equipment, and
one or more sensors attached to the movable body.

16. The tidal current information display device of claim 6, wherein
the processing circuitry is further configured to receive the tidal current information from one of:
an external communication equipment, and
one or more sensors attached to the movable body.

17. An Augmented Reality (AR) based navigation apparatus for a movable body, comprising:
an image sensor attached onto the movable body, and configured to capture an image, and output image data; and
processing circuitry configured to:
detect a position of the movable body via a positional sensing system;
receive and store tidal current information based on the detected position;
calculate an estimated time for the movable body to reach a predetermined position of a tidal current captured on the image displayed on a display screen;
generate display data for displaying a first graphical user interface (GUI) for displaying the tidal current information corresponding to the predetermined position of the tidal current on the display screen;
generate the display data for displaying a second GUI on the display screen for displaying the tidal current information at the detected position of the movable body if the detected position of the movable body coincides with the predetermined position of the tidal current;
superimpose the first and second GUIs on the image; and
display the superimposed image on the display screen, wherein
the first GUI is configured for showing:
a first gauge including the estimated time to reach the predetermined position, a direction and a speed of the tidal current at the estimated time, and
a first triangle-shaped indicator movable around a periphery of the first gauge for indicating a direction of the tidal current with respect to an estimated heading direction of the movable body at the estimated time.

18. The Augmented Reality (AR) based navigation apparatus of claim 17, wherein
the first GUI is a pop-up balloon and is further configured for showing
a ship-shaped symbol for indicating the estimated heading direction of the movable body at the estimated time.

19. The Augmented Reality (AR) based navigation apparatus of claim 17, wherein
the second GUI is a pop-up balloon and configured for showing:
a second gauge including a speed and a direction of the tidal current at the detected position of the moveable body, and a ship-shaped symbol for indicating an actual heading direction of the movable body,
a first triangle-shaped indicator movable around a periphery of the second gauge for indicating a direction of the tidal current with respect to the actual heading direction of the movable body, and
a second triangle-shaped indicator fixed around the periphery of the second gauge for indicating an estimated time, upon expiry of which, the direction of tidal current changes.

20. A method for displaying tidal current information for a movable body on an image displayed on a display screen, comprising:
capturing an image and generating image data;
detecting a position of the movable body via a positional sensing system;
receiving and storing tidal current information based on the detected position;
calculating an estimated time for the movable body to reach a predetermined position;
generating display data for displaying a first graphical user interface (GUI) for displaying the tidal current information corresponding to the predetermined position on the image displayed on the display screen;
generating the display data for displaying a second graphical user interface (GUI) for displaying the tidal current information at the detected position of the movable body if the detected position of the movable body coincides with the predetermined position of the tidal current;
superimposing the first and second GUIs on the image; and
displaying the superimposed image on the display screen, wherein
the first GUI is configured for showing:
a first gauge including the estimated time to reach the predetermined position, a direction and a speed of the tidal current at the estimated time, and
a first triangle-shaped indicator movable around a periphery of the first gauge for indicating a direction of the tidal current with respect to an estimated heading direction of the of the movable body at the estimated time.

21. A tidal current information display device for a movable body, comprising:
processing circuitry configured to:
detect a position of the movable body via a positional sensing system;
determine geographic information to be displayed on a display screen based on the detected position;
receive and store tidal current information based on the detected position;
generate display data for displaying the tidal current information corresponding to a predetermined position on the geographic information displayed on the display screen;
calculate an estimated time for the movable body to reach the predetermined position; and
display a graphical user interface (GUI) on the display screen based on the generated display data, wherein
the GUI is configured to show:
a gauge indicating a speed and direction of a tidal current at the detected position of the movable body; and
a triangle-shaped indicator positioned around a periphery of the gauge for indicating the estimated time and direction of the tidal current at the estimated time.

22. The tidal current information display device of claim 21, wherein the GUI is further configured to show an additional triangle-shaped indicator movable around the periphery of the gauge for indicating the direction of the tidal current at the detected position of the movable body.

* * * * *